INVENTORS:
JOHN R. FORD
ALLAN G. JOHNSON

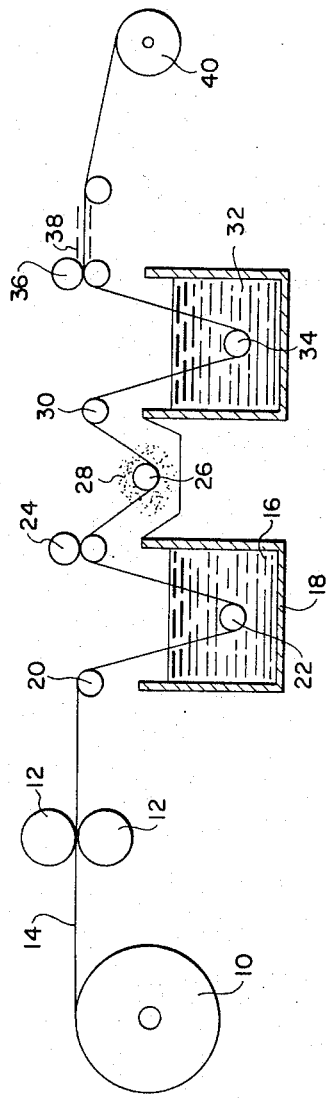
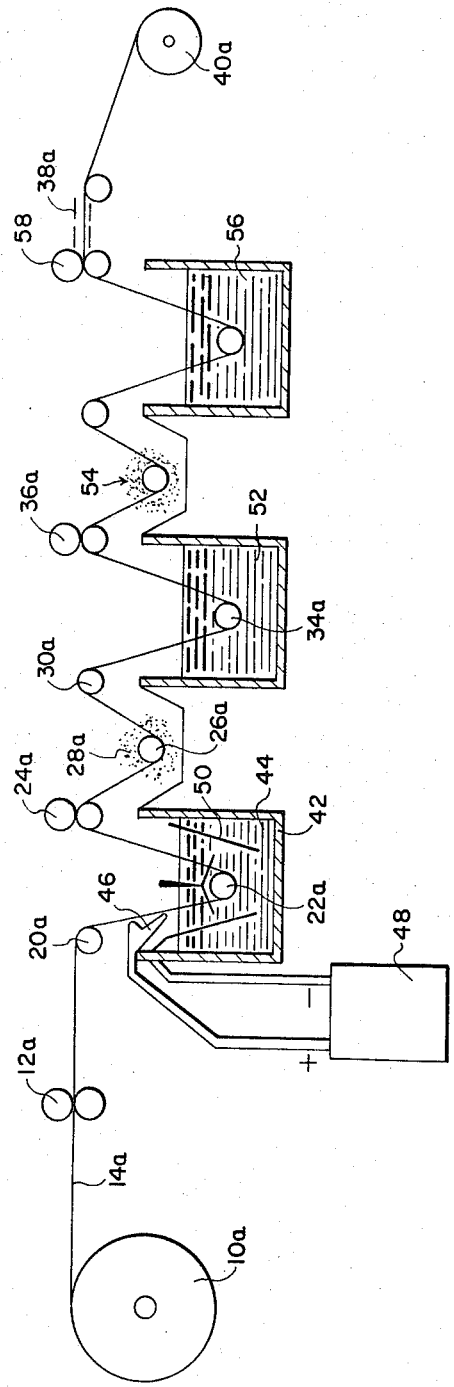

BY *Mason, Kolehmainen Rathburn & Wyss*
ATTORNEYS

United States Patent Office 3,761,368
Patented Sept. 25, 1973

3,761,368
ARRANGEMENT FOR FORMING ELECTRODE STRIPS FOR ELECTROLYTIC DEVICES
John R. Ford, Columbia City, and Allan G. Johnson, Fort Wayne, Ind., assignors to Ion Capacitor Corporation, Columbia City, Ind.
Filed Oct. 6, 1971, Ser. No. 186,903
Int. Cl. B29c 17/08; C23b 3/02
U.S. Cl. 204—129.75                                   13 Claims

ABSTRACT OF THE DISCLOSURE

An electrode strip of the so-called fabricated plate type, for use in the manufacture of electrolytic capacitors and other electrolytic devices is compacted to a thickness substantially beyond the point of decreasing surface area and is then subjected to an etching operation whereby the compacted metal particles are etched away by an amount sufficient to substantially increase the capacitance per unit volume of the strip. The etching operation is terminated when the electrical conductivity of the strip reaches a predetermined value and before the capacitance per unit area of the strip begins to decrease.

---

The present invention relates to a method of and apparatus for forming electrode strips which may be used in the manufacture of electrolytic capacitors and other electrolytic devices, and, more particularly, to electrode strips of the so-called fabricated plate type wherein the electrode strip comprises a base strip, such as gauze, paper, non-woven fabric or foil, having a multitude of metal particles deposited on both sides of the strip.

Various types of electrode strip arrangements have been heretofore employed in the manufacture of cylindrically wound electrolytic capacitors. The conventional arrangement employs a thin aluminum foil, the surface of which is etched to provide increased active surface area and hence increased capacitance of the completed capacitor. These etched electrode foil arrangements require an excessive thickness of metal in order to obtain a competitive capacitance. Also, in etched electrode foil arrangements where higher breakdown voltages are required, a thicker dielectric layer of aluminum oxide is required and this thicker layer reduces the minute openings in the etched surface which reduces the active surface area of such foil.

Another arrangement which has been employed for electrolytic capacitors in the past involves the use of a base such as cotton gauze on both sides of which minute metal particles are deposited by spraying, or the like. This so-called fabricated plate type of anode strip has the advantage that it uses less metal than the etched electrode foil but heretofore has been of substantially greater thickness and hence provides less capacitance per unit volume of the final cylindrically wound capacitor unit than the etched aluminum foil arrangement.

It is an object, therefore, of the present invention, to provide a new and improved anode strip arrangement for an electrolytic capacitor which avoids one or more of the above-discussed disadvantages of prior art arrangements.

It is another object of the present invention to provide a new and improved electrode strip arrangement for use in electrolytic capacitors wherein a fabricated plate type of anode strip is employed while providing a capacitance per unit area and capacitance per unit volume comparable to those achieved by etched anode foil capacitors.

It is another object of the present invention to provide a new and improved method of making an electrode strip for electrolytic capacitors which includes the steps of depositing metal particles on both sides of a strip of base material, compacting the deposited metal particles to a thickness at which the capacitance per unit area is substantially decreased, and then etching the compacted metal particles by an amount sufficient to substantially increase the capacitance per unit area of the strip.

It is a still further object of the present invention to provide a new and improved method of making an anode strip of the fabricated plate type wherein the fabricated plate strip is compacted to a thickness at which the capacitance per unit area of the strip is substantially decreased and then etching away portions of the compacted metal particles to provide a completed strip having a greatly increased surface area while at the same time being relatively thin to provide increased capacitance per unit volume in the finally wound capacitor.

Briefly, the above and other objects of the present invention are achieved by compacting a fabricated plate strip of material to a thickness of approximately 0.008 inch and thereafter subjecting the compacted strip to a hot nitric acid bath so that portions of the compacted metal particles are removed and provide a labyrinth of exposed crevices and valleys which greatly increases the surface area of the strip per unit volume while at the same time providing an electrode strip of reduced thickness which, when wound in the conventional manner to form an electrolytic capacitor, results in substantially increased capacitance per unit volume.

The invention, both as to its organization and method of operation, together with further objects and advantages thereof, will best be understood by reference to the following specification taken in connection with the accompanying drawings in which:

FIG. 1 illustrates an apparatus suitable for performing the method of the present invention whereby an electrolytic capacitor of substantially increased performance can be made;

FIG. 2 illustrates another type of apparatus wherein the etching step is performed by means of an electro-chemical etch process;

Figure 3:
Figure 4:

FIG. 3 is a greatly magnified plan view of a portion of the fabricated plate strip formed in accordance with the present invention and showing the condition of this strip after the compacting operation and before the etching operation; and FIG. 4 is a greatly magnified plan view of the fabricated plate strip of the present invention, similar to FIG. 3 but taken after the etching operation is performed and showing the greatly increased surface area of the strip following the compacting and etching operations performed thereon.

Referring now to the drawings and more particularly to FIGS. 1, 3 and 4 thereof, the forming operations of the present invention are performed on a supply roll 10 of fabricated plate strip material. This fabricated plate strip may be formed in any conventional manner such as shown, for example, in Brennan Pat. No. 2,280,789, Brennan Reissue Pat. No. Re. 25,084 or Keohane, Jr., Pat. No. 3,062,451. However, for the purposes of the present invention, it may be briefly stated that the roll 10 is formed by taking a strip of base material and spraying very minute molten metal particles on first one side of the base material and then spraying these minute metal particles on the other side of the base so that a strip of fabricated plate material of approximately 0.015 inch thickness is produced. Under conventional practice the strip of fabricated plate material 10 is run through calender rolls to reduce thickness to approximately 0.012 inch. The thickness of the fabricated plate strip is normally reduced to 0.012 inch because further reduction causes a substantial reduction in surface area with a consequent reduction in capacitance per unit volume. However, in accordance with a very important feature of the present invention, the roll 10 of fabricated strip material is compacted substantially below the initial point of decreasing surface area. Thus, the strip 10 is fed through a pair of calendering rolls 12 where it is compacted to a thickness of approximately 0.008 inch at which thickness the strip has been compacted substantially beyond the point of capacitance decrease and with a consequent substantial decrease in surface area of the film.

The physical condition of the strip 14 after it leaves the rolls 12 is shown in FIG. 3 at which point the strip has been compacted to a thickness of approximately 0.008 inch. FIG. 3 is a plan view corresponding to a photomicrograph of the strip 14 magnified 600 times. As will be readily apparent by reference to FIG. 3, large areas of the strip 14 have been compacted to a point where a substantial portion of the crevices and valleys of the original fabricated plate strip have been reduced.

In acordance with a further important aspect of the present invention, the compacted strip 14 is then subjected to an etching operation in which the compacted metal particles are etched by an amount sufficient to substantially increase the capacitance per unit volume of the strip 14 without increasing the thickness of the strip. In the embodiment of FIG. 1 the etching operation is performed by passing this strip through a bath of hot nitric acid 16 which is contained within a vessel 18. This strip 14 is passed through the bath 16 by moving downwardly over the rollers 20 beneath the rollers 22 positioned within the bath 16 and is led upwardly out of the bath 16 by means of the drive rollers 24.

The bath 16 is preferably a 10 percent nitric acid solution and the temperature of this bath and the speed of travel of the strip 14 are chosen to achieve the above-described increase in capacitance. However, the etching process is not continued to the point at which the electrical conductivity of the strip 14 falls below the conductivity of the original uncalendered fabricated plate strip coming off the supply roll 10. In a particular embodiment, the temperature of the bath 16 was 65° C. and the speed of the strip 14 was chosen to provide immersion of the strip in this bath for a period of seven minutes. In another example, the bath 16 was at a temperature of 95° C. and the strip 14 moved through the bath within three minutes. The desired etching of the compacted strip 14 to the desired conductivity point will be achieved under these operation conditions. The desired electrical conductivity described above is determined by measuring the conductivity of a sample strip and varying the parameters involved until the desired conductivity value is achieved. In this connection it will be understood that if the etching operation is continued for a sufficiently long period of time, the amount of compacted metal particles etched away may become sufficiently great that the capacitance will no longer increase. However, the termination of the etching process is limited by the permissible decrease in conductivity because this point is reached before the decrease in capacitance occurs.

After the etched compacted strip passes over the drive rollers 24, it is passed beneth the rollers 26 and through a water spray 28, over the rollers 30 and into a tank of high purity water 32, where it passes beneath the rollers 34 and is removed from the tank 32 by means of the drive rollers 36. The cleansed strip is then dried in a suitable dryer arrangement 38 and stored on the roller 40.

The roll 40 of fabricated strip material formed in accordance with the above-described method is thereafter subjected to a conventional oxide forming operation wherein a layer of aluminum oxide is deposited on the multi-faceted surface of the strip 14 to provide a suitable dielectric of an appropriate thickness corresponding to the desired voltage rating of the capacitor. During this oxide formation operation, the resistance of the strip will be approximately doubled over its value after the compacting and etching operations have been completed by means of the apparatus in FIG. 1. The formed fabricated plate strip on which a layer of aluminum oxide of the desired thickness has been deposited is then assembled with suitable paper spacers and cathode strip and this assembly is then rolled together and placed in a suitable case together with an electrolyte to form the conventional electrolytic capacitor, as will be readily understood by those skilled in the art. Before this assembly operation it is necessary to secure connection tabs to the anode and cathode strips by means of a suitable stitching or staking operation. The compacted-etched fabricated plate strip of the present invention has been found to be superior to prior art fabricated plate strips in that it is easier to apply these tabs to the compacted-etched strip of the present invention.

While the etching operation which follows the above-described compacting operation is illustrated as being performed by immersion in a hot nitric acid bath in the arrangement of FIG. 1, it will be understood that this etching operation may be performed by other different arrangements. For example, the compacted strip 14 may be immersed in an alkaline solution such as a five percent aqueous solution of potassium hydroxide. With such a base etch operation, the bath 16 may be at a temperature of 25° C. and the strip 14 immersed in this bath for a period of one minute to provide the above-described increase in surface area and capacitance per unit area of the strip.

In FIG. 2 a further arrangement is provided for performing the etching operation by means of an electrochemical etching apparatus. Referring to this figure, wherein components similar to the arrangement of FIG. 1 have been given the same reference numeral with the letter $a$ added, the compacted strip 14$a$ is supplied to an electrochemical etching tank 42 which contains a bath 44 which may be a 20 percent aqueous solution of sodium chloride and 1 percent sodium sulphate. A contact bar 46, which is connected to one terminal of a rectifier 48 of suitable current capacity, at low voltage, is arranged to engage the compacted strip as it enters the bath 44, the cathode structure 50 of the electrochemical etching apparatus being connected to the minus terminal of the rectifier 48, as will be readily understood by those skilled in the art. Accordingly, as the compacted strip 14$a$ moves through the bath 44, portions of the compacted metal particles on this strip are etched by electrochemical action between the positively charged compacted strip 14$a$ and the cathode structure 50. The current density during the electrochemical etching process may be 5.5 amperes per square inch and the electrochemical etching time 1 minute. Other combinations of current density and etching duration may be employed to give an electrochemical etching operation of 5.5 ampere minutes.

After the compacted strip has been electrochemically etched in the bath 44, it is rinsed in the water spray 18$a$ and then immersed in a bath 52 of hot nitric acid to remove any copper ions which have been picked up by the strip 14$a$ due to sliding contact with the bar 46, as well as to remove iron and any of the salts of the bath 44 so that a high purity, etched, compacted strip is provided. This strip is then moved by the driven rollers 36$a$ out of the bath 52 and through another water spray 54 and into a tank of high purity water 56 from which the final drive rollers 58 remove the finally cleansed strip so that it can be passed through the dryer 38$a$ and stored on the spool 40$a$.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A method of making an electrode strip for an electrolytic device which includes the steps of depositing molten metal particles on both sides of a strip of base material, compacting the deposited metal particles to a thickness at which the capacitance per unit area of the electrode strip is substantially decreased, and then etching the compacted metal partices by an amount sufficient to substantially increase the capacitance per unit volume of said strip.

2. The method as set forth in claim 1, wherein said etching step is performed by immersing said compacted metal particle strip in a bath of hot nitric acid.

3. The method as set forth in claim 1, wherein said etching step is performed by immersing the compacted strip in a bath of 10 percent nitric acid at a temperature of 65° C.

4. The method as set forth in claim 1, wherein said etching step is performed by immersing the compacted strip in a bath of nitric acid at a temperature of approximately 65° C. for a period of approximately seven minutes.

5. The method as set forth in claim 1, wherein said etching step is terminated just prior to the point at which the electrical conductivity of the strip is reduced.

6. The method as set forth in claim 1, wherein said etching step is performed by immersing the compacted strip in a basic solution.

7. The method as set forth in claim 6, wherein said basic solution is 5 percent potassium hydroxide.

8. The method as set forth in claim 7, wherein said etching step is performed at a temperature of 25° C.

9. The method as set forth in claim 8, wherein said etching step is performed for a period of approximately one minute.

10. The method as set forth in claim 1, wherein said etching step is performed by immersing the compacted strip in an etching solution while passing an electrical current through the strip as it is immersed.

11. The method as set forth in claim 10, wherein said etching solution is a 20 percent solution of sodium chloride and 1 percent sodium sulphate.

12. The method of claim 10, wherein said electrical current has an average current density of approximately 5.5 amperes per square inch.

13. The method of claim 10, wherein said strip is immersed for from 1 to 10 minutes.

References Cited

UNITED STATES PATENTS

| | | | |
|---|---|---|---|
| 2,218,076 | 10/1940 | Werner | 204—141 |
| 3,578,570 | 5/1971 | Kissin | 204—141 |
| 3,663,387 | 5/1972 | Harrison | 204—141 |
| 1,705,944 | 3/1929 | Siegmund | 204—141 |

FOREIGN PATENTS

| | | | |
|---|---|---|---|
| 25,823 | 11/1934 | Australia | 204—141 |
| 871,920 | 7/1961 | Great Britain | 204—141 |
| 518,733 | 1938 | Great Britain | 204—141 |

OTHER REFERENCES

Georgieu, A. M., The Electrolytic Capacitor (1945), Murray Hill Books, New York, 55–61.

THOMAS TUFARIELLO, Primary Examiner

U.S. Cl. X.R.

156—7; 204—129.35